United States Patent [19]

Narita et al.

[11] Patent Number: 4,644,571

[45] Date of Patent: Feb. 17, 1987

[54] TIMER

[75] Inventors: Ryuuho Narita; Masahiro Imai, both of Nagoya, Japan

[73] Assignee: Kabushiki Kaisha Toshiba, Kawasaki, Japan

[21] Appl. No.: 770,091

[22] Filed: Aug. 28, 1985

[30] Foreign Application Priority Data

Sep. 14, 1984 [JP] Japan ............................... 59-193083

[51] Int. Cl.[4] ........................ H01H 43/02; A47J 31/52

[52] U.S. Cl. ........................................ 377/56; 377/20; 99/280; 99/286; 368/9; 368/82

[58] Field of Search ..................... 99/280, 286; 377/19, 377/20, 56; 368/9, 10, 82

[56] References Cited

U.S. PATENT DOCUMENTS

| | | | |
|---|---|---|---|
| 4,196,582 | 4/1980 | Hersberger et al. | 368/70 |
| 4,250,370 | 2/1981 | Sasaki et al. | 377/20 |
| 4,379,339 | 4/1983 | Narita | 364/900 |
| 4,406,217 | 9/1983 | Oota | 99/286 |
| 4,412,481 | 11/1983 | Oota et al. | 99/280 |
| 4,459,524 | 7/1984 | Oota et al. | 99/286 |
| 4,566,802 | 1/1986 | Koehler | 368/9 |

FOREIGN PATENT DOCUMENTS

| | | |
|---|---|---|
| 0055144 | 9/1985 | European Pat. Off. . |
| 2156831 | 6/1973 | France . |
| 2397670 | 2/1979 | France . |

*Primary Examiner*—John S. Heyman

*Attorney, Agent, or Firm*—Cushman, Darby & Cushman

[57] ABSTRACT

A timer device, which displays a load operation state, includes a clock counter, a load counter, a display and a controller. The display displays a count value of the load counter when the load counter is counting and displays a count value of the clock counter otherwise. The controller causes the display to flash in synchronism with the changing of the count of the load counter when the load counter is being operated.

7 Claims, 7 Drawing Figures

TIMER

BACKGROUND OF THE INVENTION

1. Field of the Invention

The present invention relates to a timer device including a clock counter for determining real time and a load counter for controlling the operating time of a load. In particular, the present invention relates to a timer device having a display unit indicating the operation state of the load.

2. Description of the Prior Art

Timers, such as for a combination coffee maker which automatically mills the coffee beans, then drips water through the grounds, have been known up to now. Such a known timer for a coffee maker has a clock counter for determining real time and a load counter controlling the milling time. The timer also has a display unit which usually displays the real time from the clock counter, but displays the count value of the load counter, i.e., the remaining milling time, during the milling operation. Further, the display of the display unit during the milling operation is flashed in synchronism with changes in the seconds unit of the clock counter output to indicate that the device is milling.

A problem with this conventional timer is that the counting operation of the load counter is begun in response to the operation of a start key which starts the milling process. However, the counting operation of the load counter will not necessarily be synchronized with the second unit counting action of the clock counter, because the time depression of the start key will not necessarily be synchronized with the clock counter. Therefore, when the display of the count value of the load counter is flashed in response to changes in the seconds unit of the clock counter, the timing of the flashing display does not coincide with the timing of the switching over of the count value being displayed, causing the display to be difficult to view and liable to be read in error.

SUMMARY OF THE INVENTION

It is an object of the present invention to provide an improved timer device wherein, when the display unit flashes the count from the load counter, the timing of this flashing can be made to coincide with the timing of the change over the count value being displayed, thus avoiding the risk of the display being read erroneously due to the display becoming difficult to view.

BRIEF DESCRIPTION OF THE DRAWINGS

These and other objects and advantages of this invention will become more apparent and more readily appreciated from the following detailed description of the presently preferred exemplary embodiment of the invention, taken in conjunction with the accompanying drawings of which.

DETAILED DESCRIPTION OF THE PRESENTLY PREFERRED EXEMPLARY EMBODIMENT

An embodiment of the present invention applied to a coffee maker will be described in more detail with reference to the accompanying drawings.

Figure 1:
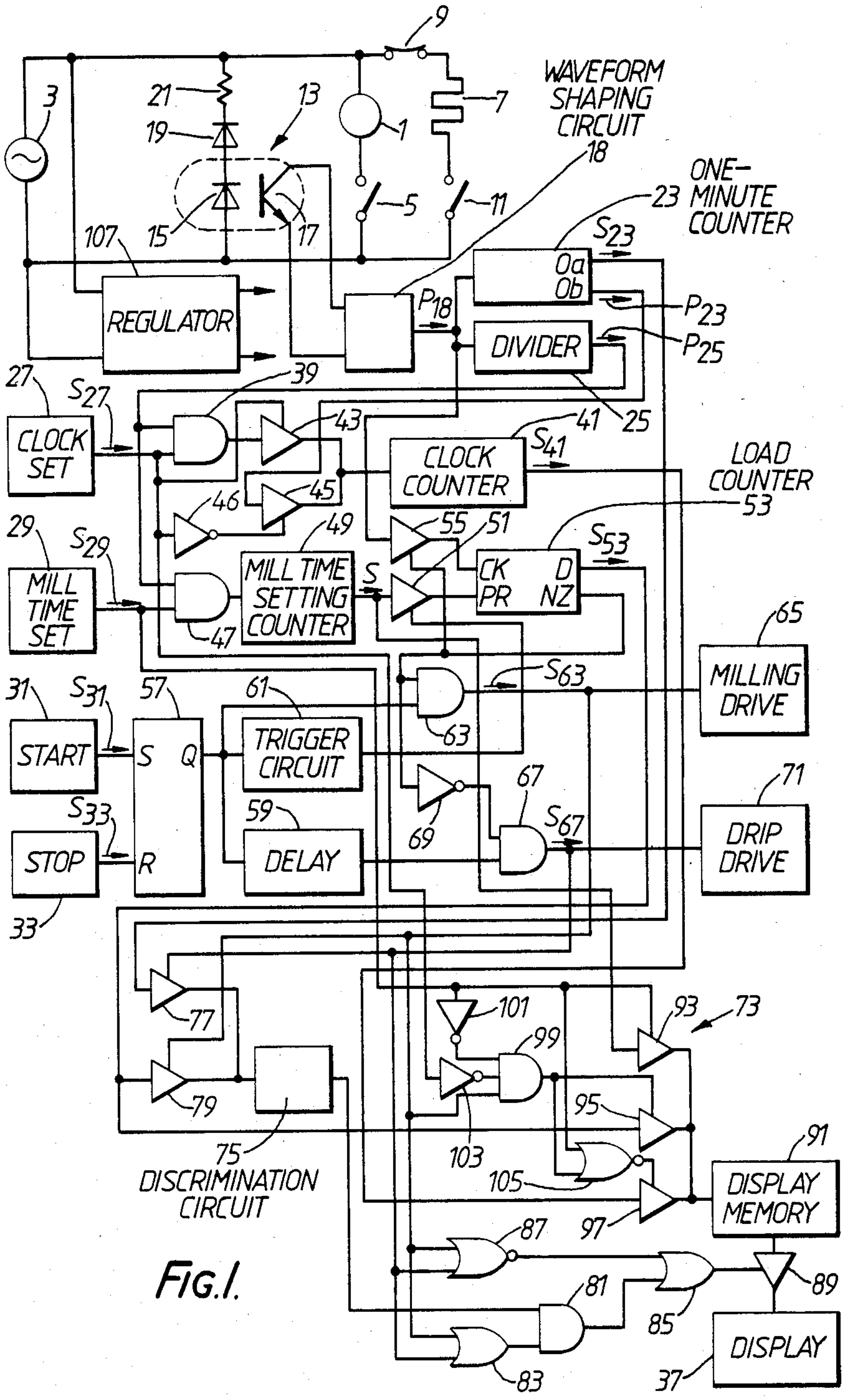
FIG. 1 shows a block diagram of an embodiment of this invention applied to a coffee maker.

Referring to FIG. 1, there is shown a block diagram of an embodiment. A coffee mill motor 1 is connected to an AC power source 3 through a first switch 5 (normally open type). Coffee mill motor 1, serving as a load, drives a cutter (not shown) for milling coffee beans in a milling case.

A heater 7 for boiling water has one end connected to coffee mill motor 1 through a thermal switch 9 and another end connected to power source 3 through a second switch 11 (normally open type). The water boiled by heater 7 is fed to the mill case.

Figure 2:
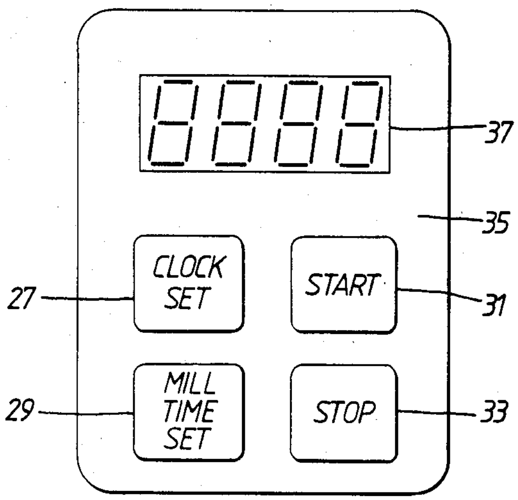
FIG. 2 shows a front view of an operation panel.

A timer device controlling the above-described circuit will be described with reference to FIGS. 1–4. A clock pulse generating circuit 13 includes a light emitting diode 15, a photo-transistor 17 and a waveform shaping circuit 18. The cathode of light emitting diode 15 is connected to AC power source 3 through an ordinary diode 19 and a resistor 21. The anode of diode 15 is directly connected to power source 3. The collector and emitter of photo-transistor 17 are connected to the input of waveform shaping circuit 18. Thus, the waveform shaping circuit 18 produces 60 clock pulses $P_{18}$ per second from its output when the power source is 100 V, 60 Hz single phase AC. the input of a one-minute counter 23 is connected to the output of waveform shaping circuit 18. When one-minute counter 23 receives clock pulses $P_{18}$ from the clock pulse generating circuit 13, it divides clock pulses $P_{18}$ in frequency, performing a repetitive count operation in which 60 seconds of pulses are divided into 1/10 second intervals. Then one-minute counter 23 outputs a count signal $S_{23}$ from one of its outputs $O_a$ having one pulse every second. One-minute counter 23 also produces one-minute pulse $P_{23}$ from the other of its outputs $O_b$ once per minute. A frequency dividing circuit 25, whose input is connected to the output of waveform shaping circuit 18, divides the frequency of clock pulses $p_{18}$ so as to output one-second pulse $P_{25}$ every second. A clock-setting key (clock setting means) 27, a milling-time-setting key (load operation time setting means) 29, a start key 31 and a stop key 33 are provided on a control panel 35 as shown in FIG. 2. Depressing clock-setting key 27 produces a high level clock-setting signal $S_{27}$. Depressing milling-time-setting key 29 produces a high level milling-time-setting signal $S_{29}$. Depressing start key 31 produces a high level start signal $S_{31}$. Depressing stop key 33 produces a high level stop signal $S_{33}$. A display unit 37 mounted on control panel 35 is a four-figure segment-type display.

The output of clock-setting key 27 is connected to one of the inputs of an AND circuit 39. The other input of AND circuit 39 is connected to the output of frequency dividing circuit 25. The output of AND circuit 39 is connected to the input of a clock counter 41 through a transfer gate circuit 43. The input of clock counter 41 is also connected to the one pulse per minute output $O_b$ of one-minute counter 23 through a transfer gate circuit 45. Clock counter 41, counting hours and minutes, outputs its counter signal $S_{41}$. The gate of transfer gate circuit 43 is connected to the output of clock-setting key 27. The gate of transfer gate circuit 45 is connected to the output of clock-setting key 27 through an inverter circuit 46.

One of the inputs of an AND circuit 47 is connected to the output of the milling-time-setting key 29, the other input of which is connected to the output of frequency dividing circuit 25. The output of AND gate 47 is connected to the input of a milling-time-setting counter 49. The output of milling-time-setting counter 49 is connected through a transfer gate circuit 51 to the pre-set input PR of a load counter 53 consisting of a down-counter. Load counter 53 includes a clock input CK, output D and not-zero output NZ. The not-zero output NZ becomes low when the counting value of load counter 53 is 0 and is high level when the counting value is other than 0. The clock input CK of load counter 53 is connected to the output of waveform shaping circuit 18 through a transfer gate circuit 55, and the not-zero output NZ is connected to the gate of transfer gate circuit 55. In this case, the load counter 53 includes a frequency dividing circuit which divides the frequency of clock pulses $P_{18}$ which are supplied from waveform shaping circuit 18 to the clock input CK through transfer gate circuit 55, thereby decrementing the count in load counter 53 once every second.

The output of start key 31 is connected to the set-input S of an RS flip-flop circuit 57. The output of stop key 33 is connected to the reset-input R of flip-flop 57. The Q output of flip-flop circuit 57 is connected to the input of a delay circuit 59 having a delay time of about 100 msec. The set-output Q is further connected to the input of a trigger circuit 61 and one of the inputs of an AND circuit 63. The other input of AND circuit 63 is connected to the not-zero output NZ of load counter 53, the output of which is connected to a milling drive circuit 65. The milling drive circuit 65 is so constructed that the first switch 5 is closed while a high level milling drive signal $S_{63}$ is supplied from AND circuit 63 thereto. The output of trigger circuit 61 is connected to the gate of transfer gate 51. The output of delay circuit 59 is connected to one of the inputs of AND circuit 67. The other input of AND circuit 67 is connected to not-zero output NZ load counter 53 through inverter circuit 69. The output of AND circuit 67 is connected to a drip drive circuit 71. Drip drive circuit 71 is so constructed that second switch 11 is closed while a high level drip drive signal $S_{67}$ is supplied from AND circuit 67 thereto.

The construction of a control circuit 73 for controlling display unit 37 is described as follows. The input of a discrimination circuit 75 is connected to the output $O_a$ of one-minute counter 23 through a transfer gate circuit 77, and is connected to the output D of load counter 53 through a transfer gate circuit 79. The gate of transfer gate circuit 77 is connected to the output of AND circuit 67. The gate of transfer gate 79 is connected to the output of AND circuit 63. Discrimination circuit 75 is so constructed that it outputs a high level signal when the value of the 1/10 second unit of the count signal from load counter 53 (described below) is 0 or even 4, and outputs a low level signal when the value is odd.

The output of discrimination circuit 75 is connected to one of the inputs of an AND circuit 81. The other input of AND circuit 81 is connected to the output of an OR circuit 83. One of the inputs of OR circuit 83 is connected to the output of AND circuit 63, and the other is connected to the output of AND circuit 67. Further, the output of the AND circuit 81 is connected to one of the inputs of an OR circuit 85, the other input of which is connected to the output of a NOR circuit 87. One of the inputs of NOR circuit 87 is connected to the output of AND circuit 63 and the other input is connected to the output of AND circuit 67.

The output of OR circuit 85 is connected to the gate of a transfer gate circuit 89, the input of which is connected to the output of a display memory 91, the output of which is connected to the input of display unit 37. Further, the output of milling-time-setting counter 49, output D of load counter 53 and the output of clock counter 41 are connected to the input of display memory 91 through a transfer gate circuit 93, 95 and 97, respectively. The gate of transfer gate circuit 93 is connected to the output of milling-time-setting key 29. The gate of the transfer gate circuit 95 is connected to the output of an AN circuit 99. AND circuit 99 has a first input connected to the output of milling-time-setting key 29 through an inverter circuit 101, a second input connected to the output of clock-setting key 27 through an inverter circuit 103, and a third input connected to the output of AND circuit 63. In addition, the gate of transfer circuit 97 is connected to the output of a NOR circuit 105, one of the inputs of which is connected to the output of milling-time-setting key 29, the other input of which is connected to the output of AND circuit 99.

A DC constant-voltage power circuit 107 is connected to power source 3 drops the voltage of AC power source 3 into a prescribed voltage, then rectifies and stabilizes the prescribed voltage to supply the individual circuits with the prescribed voltage as DC constant-voltage.

The operation of the above-disclosed embodiment will now be described.

Figure 3:
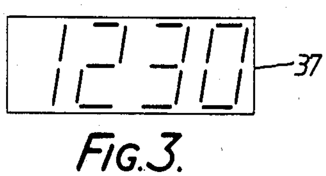
FIGS. 3 and 4 show respective front views of different display states of a display unit.

First of all, when the clock-setting key 27 is pressed, the high level clock-setting signal $S_{27}$ output from the key 27 is supplied to one of the inputs of AND circuit 39 and gate of transfer gate circuit 43 simultaneously. Consequently, one-second pulses $P_{25}$ from the frequency dividing circuit 25 are supplied to clock counter 41 through AND circuit 39 and transfer gate circuit 43. Thus, the value of clock counter 41 is changed every second, every time a one-second pulse $P_{25}$ is supplied to clock counter 41. At this point, a high level milling-time-setting signal $S_{29}$ is not produced from the milling-time-setting key 29. Since the output signal from AND circuit 99 is a low level, NOR circuit 105 outputs a high level signal, which is supplied to the gate of transfer gate circuit 97. The count signal $S_{41}$ from clock counter 41 is therefore supplied to the input of the display memory 91 through the transfer gate circuit 97. Furthermore, the output signals of AND circuits 63 and 67 are low levels, so NOR circuit 87 produces a high level signal, which is supplied to the gate of transfer gate circuit 89 through OR circuit 85. The display unit 37 therefore displays the content of the display memory 91, that is, the count value of clock counter 41. If clock-setting key 27 is released when the display has reached the current time, e.g., "1230" (12:30), as shown in FIG. 3, the output signal of inverter circuit 46 will become a high level, thus the one-minute pule $P_{23}$ from the output $O_b$ of one-minute counter 23 is supplied to the input of clock counter 41 through transfer gate circuit 45. The count value of clock counter 41 therefore changes every time a one-minute pulse $P_{23}$ is supplied, i.e., every minute, and the display of display means 37 shows the current time, such as "1231" (12:31), "1232" (12:32), . . .

When making coffee, a certain amount of the coffee beans corresponding to the desired amount of coffee is provided to the milling container, and a quantity of water corresponding to the amount of coffee beans is supplied to the water tank. When milling-time-setting key 29 is operated, milling-time-setting key 29 produces a high level milling-time-setting signal $S_{29}$ which is supplied to one of the inputs of AND circuit 47. Consequently, one-second pulses $P_{25}$ from the frequency dividing circuit 25 are supplied to the input of milling-time-setting counter 49 through AND circuit 47, causing milling-time-setting counter 49 to increment by one every second when a one-second pulse $P_{25}$ is supplied. The high level milling-time-setting signal $S_{29}$ is also provided to one of the inputs of NOR circuit 105. Consequently, it causes the output of NOR circuit 105 to become a low level. As a result of that, transfer gate circuit 97 is off, preventing display memory 91 from receiving the count-signal $S_{41}$ of clock counter 41.

Figure 4:
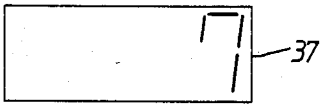

When a high level milling-time-setting signal $S_{29}$ is provided to the gate of transfer gate circuit 93, the count-signal $S_{49}$ of milling-time-setting counter 49 is provided to display memory 91 through transfer gate circuit 93. Thus, display unit 37 indicates the time set for milling. If milling-time-setting key 29 is released when display unit 37 is indicating the optimum milling time (for example, 7 seconds as shown in FIG. 4), milling-time-setting signal $S_{29}$ then ceases and the counting operation of milling-time-setting counter 49 stops, so that the count value is 7. It should be noted that when milling-time-setting key 29 is released, display means 37 again indicates the current time, because when milling-time-setting signal $S_{29}$ ceases, transfer gate circuit 93 is in the OFF state, and transfer gate circuit 97 is in the ON state.

After that, if start key 31 is pressed for a short time, high level start signal $S_{31}$ is produced by start key 31. Flip-flop circuit 57 then assumes a set state in response to the rise of start signal $S_{31}$, so that its Q output changes from a low level to high level. Trigger circuit 61 is then triggered in response to the rise of the output signal of the output Q to output a trigger pulse which is sent to the gate of transfer gate circuit 51. The count signal $S_{49}$ of milling-time-setting counter 49 is supplied to the pre-set input PR of load counter 53 through transfer gate circuit 51 so that the count signal $S_{49}$ indicating the counting value 7, for example, is pre-set in load counter 53. Subsequently, the output signal of the not-zero output NZ of load counter 53 is inverted into high level, both inputs of AND circuit 63 become high to output a high level milling drive signal $S_{63}$. The high level milling drive signal $S_{63}$ is supplied to milling drive circuit 65, which permits first switch 5 to close, thereby energizing coffee mill motor 1 to rotate the cutter for milling the beans. Since the high level output signal of the not-zero output NZ of load counter 53 is also supplied to the gate of transfer gate circuit 55, clock pulses $P_{18}$ from waveform shaping circuit 18 are supplied to the clock input CK of load counter 53 through transfer gate circuit 55, to decrement load counter 53 once per second. Furthermore, the high level milling drive signal $S_{63}$ from AND circuit 63 is supplied to the third input of AND circuit 99. At this time, the first input of AND circuit 99 is provided with a high level signal from inverter circuit 101 since milling-time-setting signal $S_{29}$ is not being produced, and its second input is also high due to inverter circuit 103, since clock-setting signal $S_{27}$ is not being produced. Therefore, AND circuit 99 produces a high level signal and feeds it to the gate of transfer gate circuit 95. Count signal $S_{53}$ of load counter 53 is thereby supplied to the input of display memory 91 through transfer gate circuit 95. Since the high level milling drive signal $S_{63}$ of AND circuit 63 is also supplied to the gate of transfer gate circuit 79, count signal $S_{53}$ of load counter 53 is supplied to the discrimination circuit 75 through transfer gate circuit 79. Thus when the 1/10 second units of the count value indicated by the count signal $S_{53}$ is 0 or even, the output signal of discrimination circuit 75 is a high level, and when it is odd, the output signal is a low level. Consequently, in this case the output signal of discrimination circuit 75 is a high level while the count value indicated by the count signal $S_{53}$ is 6, 4, 2, 0. The high level signal of discrimination circuit 75 is supplied to one of the inputs of AND circuit 81. The high level milling drive signal $S_{63}$ is further supplied to the other input of AND circuit 81 through OR circuit 83, so the high level output signal of discrimination circuit 75 is supplied to the gate of transfer gate circuit 89 through AND circuit 81 and OR circuit 85. The count values of 6, 4, 2 and 0 in the count signal $S_{53}$ being memorized in display memory 91 is therefore fed to display unit 37. Display unit 37 shows the flashing display with a period of 2 seconds, illuminated for 1 second and extinguished for 1 second. That is, remaining milling time is displayed in the following manner: for second 7 the display is extinguished, for second 6 it is illuminated, for second 5 it is extinguished, for second 4 it is illuminated, . . . , and for second 0 it is illuminated.

Figure 5:
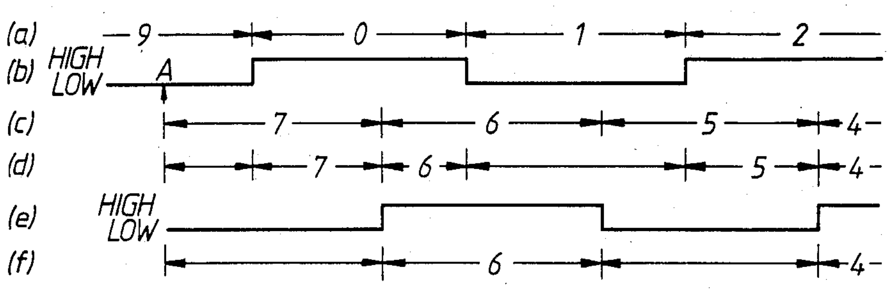
FIGS. 5 to 7 are timing charts useful in explaining the operation of the embodiment of FIG. 1 in which: graph (a) in each of FIGS. 5–7 shows one second intervals of a seconds unit output of a one-minute counter; each graph (b) shows a flashing timing synchronized with the seconds unit output of the one-minute counter; each graph (c) shows each count value of a load counter; each graph (d) shows a conventional display state of a display unit; each graph (e) shows a flashing timing in the present embodiment; and each graph (f) shows a display state of the present embodiment.
Figure 6:
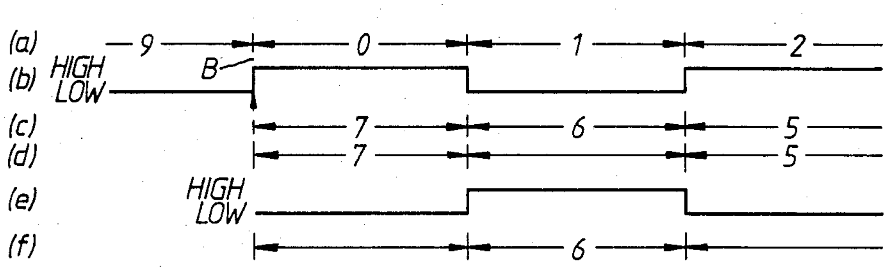
Figure 7:
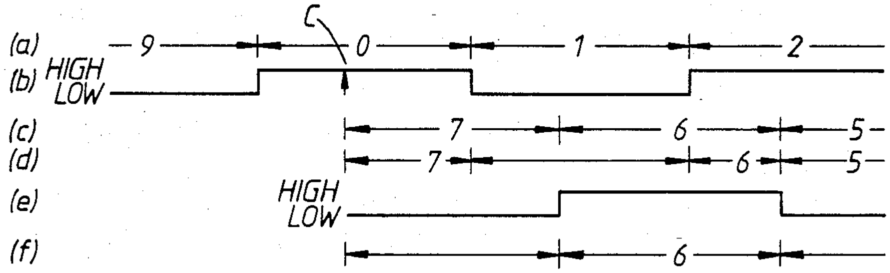

FIGS. 5–7 show the different modes of display between the present embodiment and prior art. Graph (a) in each FIGURE, indicates each one second interval of the seconds unit (first unit of one-minute counter 23). Graph (b), in each FIGURE, indicates the flashing timing synchronized with the seconds unit of one-minute counter 23 (high corresponds to a display state and low corresponds to a no display state).

FIG. 5 shows the case in which the milling operation is started (when start key 31 is pressed) at point A. The count value of load counter 53 is shown in FIG. 5(*c*). Conventionally, the display flashes with the time as shown in FIG. 5(*b*), so the display of the remaining milling time is as shown in FIG. 5(*d*). That is, the display of the count value changes during the illumination period as is seen in FIG. 5(*d*). FIG. 5(*e*) shows the flashing timing in the present embodiment. It can be seen that the flashing timing of the display coincides with the timing of the change over of the display value as is illustrated in FIG. 5(*f*) which shows the display of the remaining milling time in accordance with the present embodiment.

FIG. 6 shows the case in which the start-point of the milling operation is the point B. FIG. 6(*c*), FIG. 6(*d*), FIG. 6(*e*) and FIG. 6(*f*) correspond to FIG. 5(*c*), FIG. 5(*d*), FIG. 5(*e*) and FIG. 5(*f*), respectively. In this case, since the point when start key 31 is pressed happens to be in synchronism with the point when the seconds unit of the clock changes, the same display is obtained in the conventional case and the present embodiment. FIG. 7 shows the case in which the start-point of the milling operation is the point C. FIG. 7(*c*), FIG. 7(*d*), FIG. 7(*e*) and FIG. 7(*f*) correspond to FIG. 5(*c*), FIG. 5(*d*), FIG. 5(*e*) and FIG. 5(*f*), respectively. It can be seen that an irregular display is produced in the conventional case.

After the display operation, when the count value of load counter 53 goes to 0, the output signal of the not-zero output NZ is inverted into a low level, AND circuit 63 ceases to output a high level milling drive signal $S_{63}$, so milling drive circuit 65 opens first switch 5 to stop the milling operation. When, subsequently, the signal of the not-zero output NZ of load counter 53 is inverted to a low level, the output signal of inverter circuit 69 becomes high, so AND circuit 67 outputs a high level drip drive signal $S_{67}$. Drip drive circuit 71 closes second switch 11 to energize heater 7, so that it starts to supply hot water into the milling container and thus starts the extraction of the coffee liquid. At this time, when AND circuit 63 ceases to output milling drive signal $S_{63}$, the output signal of AND circuit 99 becomes low. Thus, transfer gate circuit 95 disables load counter 53 from feeding the count signal $S_{53}$ to display memory 91. Also, since the output signal from AND circuit 99 is low and milling-time-setting signal $S_{29}$ is not being output, the output signal of NOR circuit 105 becomes high, so that the count signal $S_{41}$ of clock counter 41 is now supplied to display memory 91 through transfer gate circuit 97. Furthermore, the high level drip drive signal $S_{67}$ from AND circuit 67 is also supplied to the gate of transfer gate circuit 77 to enable transfer gate circuit 77 to supply the count signal $S_{23}$ of one-minute counter 23 to the input of discrimination circuit 75. As a result, the output signal of discrimination circuit 75 is a high level when the count value of the seconds unit in the count signal $S_{23}$ is 0 or even, and is low level when it is odd. This output signal is supplied to one of the inputs of AND circuit 81. At this time, the other input of AND circuit 81 is supplied with the high level drip drive signal $S_{67}$ through OR circuit 83, so the high level output of discrimination circuit 75 is fed to the gate of transfer gate circuit 89 through AND circuit 81 and OR circuit 85. Display unit 37 therefore indicates current time flashing with a period of two seconds.

It should be noted that during the milling operation or during the drip operation as above-described or when the drip operation is completed, if the stop signal $S_{33}$ is produced by pressing stop key 33 for a short time, flip-flop circuit 57 is reset so that the output Q becomes low. Subsequently, each one of the inputs of AND circuits 63 and 67 becomes low level to stop the output of milling drive signal $S_{63}$ and drip drive signal $S_{67}$.

According to the present embodiment described above, during milling, display unit 37 is flashed in step with the count action of load counter 53 which controls the milling time by down counting the remaining milling time. Consequently, the timing of the flashing of the display can be synchronized with the timing of change over of the number display. This prevents users from reading the display incorrectly, since the flashing of the display occurs regularly, i.e., the number changes every each flashing time of the display.

Although, in the above embodiment, the display of display unit 37 flashes with a period of two seconds, the flashing period could be set to any desired value. Furthermore in this embodiment, the present invention was applied to a coffee maker, but the present invention could be applied to any electrical apparatus which is equipped with a clock counter and a load counter and wherein the count value of the load counter is displayed as flashing while the load is being driven.

Many changes and modifications in the above-described embodiment could be carried out without departing from the scope of the present invention. Therefore, the claims should be construed to include such modifications.

What is claimed is:

1. A timer device for controlling a load comprising:
- clock counter means for counting clock pulses having a predetermined period;
- load counter means for counting load pulses having a predetermined period;
- means, responsive to said load counter means, for operating said load;
- means for displaying a count value of said load counter means when said load counter means is counting and for displaying a count value of said clock counter means otherwise; and
- control means for making the display of the count value of said load counter means in said displaying means flash in step with the changing of the count value of said load counter means while said load counter means is counting.

2. A timer device according to claim 1, further including means for setting a desired load operation time in said load counter means.

3. A timer device according to claim 2, further including start means for causing said load counter means to start counting.

4. A timer device according to claim 3, wherein said displaying means includes a display memory for storing the value of said clock counter means or the value of said load counter means to be displayed.

5. A timer device according to claim 4, wherein said control means includes discrimination circuit means for outputting a high level signal to said displaying means for predetermined ones of the count values of said load counter means, said high level signal causing said displaying means to produce a display.

6. A timer device according to claim 5, wherein said predetermined count values are 0 and even.

7. A timer device according to claim 5, wherein said predetermined count values are odd.

* * * * *